US011836548B2

(12) United States Patent
Manika et al.

(10) Patent No.: US 11,836,548 B2
(45) Date of Patent: Dec. 5, 2023

(54) SMART EVENT MONITORING OF IOT DEVICES USING MESSAGE QUEUE

(71) Applicant: T-Mobile USA, Inc., Bellevue, WA (US)

(72) Inventors: Ganesh K. Manika, Kenmore, WA (US); Sergey Slovetskiy, Bellevue, WA (US); Phani Ramisetty, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/795,358

(22) Filed: Feb. 19, 2020

(65) Prior Publication Data

US 2021/0257114 A1 Aug. 19, 2021

(51) Int. Cl.
*G06F 9/54* (2006.01)
(52) U.S. Cl.
CPC .............. *G06F 9/546* (2013.01); *G06F 9/542* (2013.01)
(58) Field of Classification Search
CPC ................................ G06F 9/546; G06F 9/542
See application file for complete search history.

(56) References Cited

U.S. PATENT DOCUMENTS

| 9,577,972 | B1 * | 2/2017 | Word | H04L 51/26 |
|---|---|---|---|---|
| 9,838,476 | B2 * | 12/2017 | Maturana | H04L 67/2828 |
| 2014/0047064 | A1 * | 2/2014 | Maturana | G05B 23/0216 |
| | | | | 709/217 |
| 2015/0134857 | A1 * | 5/2015 | Hahn | G06F 3/061 |
| | | | | 710/5 |
| 2015/0281355 | A1 * | 10/2015 | Maturana | G06F 9/548 |
| | | | | 709/202 |
| 2018/0368202 | A1 * | 12/2018 | Landais | H04W 4/70 |
| 2019/0007511 | A1 * | 1/2019 | Rodriguez | G08B 21/18 |
| 2019/0227859 | A1 * | 7/2019 | Kaneko | H04L 67/1097 |
| 2019/0349426 | A1 * | 11/2019 | Smith | H04L 67/104 |
| 2020/0076939 | A1 * | 3/2020 | Lambourne | H04W 4/20 |

* cited by examiner

*Primary Examiner* — Kevin L Young
*Assistant Examiner* — Carina Yun
(74) *Attorney, Agent, or Firm* — Lee & Hayes, P.C.

(57) ABSTRACT

A system for routing Internet-of-Things (IoT) device notifications, or a method therefore are described. For example, a system includes a processor; and computer-readable instructions that, when executed by the processor, cause the system to perform operations including receiving, from a notification customer, preferences for a selection of notifications associated with IoT devices; storing each notification of the notifications in one or more message queues, the message queues being associated with the preferences; and transmitting the selection of the notifications to the notification customer, wherein the selection of notifications comprises a subset of the notifications.

20 Claims, 6 Drawing Sheets

SMART EVENT MONITORING OF IOT DEVICES USING MESSAGE QUEUE

BACKGROUND

Internet-of-Things (IoT) devices are everyday physical devices that include electronics, software, sensors, and connectivity components to collect data and communicate the data over a network, e.g., a wireless network. IoT devices span many industries, such as consumer products, manufacturing, medical devices, and infrastructure equipment. Mobile devices, smart devices, vehicles, utility meters, flow sensors, location trackers, pace makers, and refrigerators are but a few examples of IoT devices. In addition to the types of IoT devices, the number of IoT devices has greatly increased. Such an increase in the number of IoT devices is only expected to continue and, in fact, it is expected that there could be a compound annual growth rate of 30% over the next few years alone.

Some wireless communication networks also offer narrow band networks, e.g., constrained radio networks, meant for low bandwidth devices. Such narrow band networks generally should not be used for general data traffic by mobile devices such as, for example, smartphones, tablets, etc. The narrow band networks are primarily meant for use by low constrained devices, often configured as IoT devices. Examples of narrow band devices include, for example, tracking devices, e.g., tracking for pets, vehicles, boats, and even people, level indicators, e.g., trash cans, fuel tanks, water tanks, etc. Such narrow band devices are usually in a "sleep," e.g., low-power, mode and when the narrow band devices need data, the narrow band devices "wake up," e.g., become active, collect the data and send the data to the appropriate party or parties. Afterwards, the narrow band devices go back to sleep. Thus, the narrow band devices intermittently use data provided by the narrow band network of a wireless communication network.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1A:
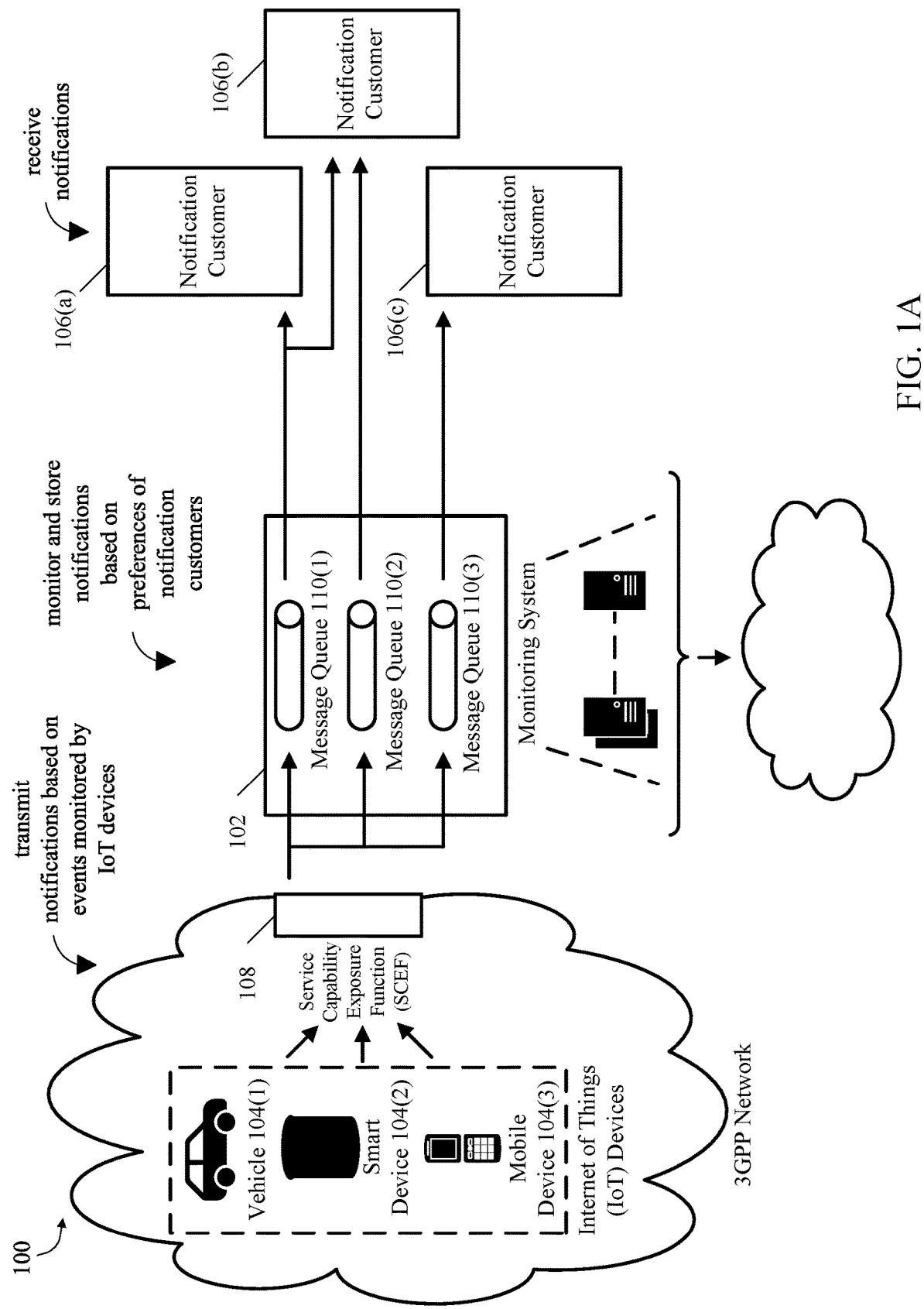
FIG. 1A is a system according to an embodiment for distributing IoT notifications.

This disclosure is directed to methods and systems for efficiently distributing Internet-of-Things (IoT) device notifications. The disclosed systems and methods permit a telecommunications network to efficiently identify, control, and route notifications provided by IoT devices to the telecommunications network.

Communication protocols have been developed to support the proliferation of new IoT devices. Lightweight M2M (LWM2M) defines an application layer protocol that supports IoT architectures on 3GPP networks. Other application protocols that support IoT architectures include the Message Queuing Telemetry Transport (MATT) protocol, the Long Range (LoRa) protocol, and the SIGFOX protocol.

By using these application protocols, IoT devices can access 3GPP network resources via Service Capability Server (SCS) nodes, service capability exposure functions (SCEF's), and Application Server (AS) nodes. These application protocols enable messages (e.g., IP and non-IP messages) to be sent between the IoT device and the SCEF or the AS node.

However, when notifications are received by the SCS node, the SCS node sends the notifications to their intended recipients on a "first-in, first-out" basis. The notifications received by the SCS node are sent in a non-discretionary or non-preferential manner to the notification customers within the telecommunication network. The notifications that are provided by the IoT devices are routed a similar manner regardless of the notifications being of different types, regardless of the IoT devices being of different types, regardless of the notifications being used for different purposes, and regardless of the notifications being used for transferring different types of information. Such notifications are provided to notification customers that have a preference to receive the notifications as well as to notification customers that do not have a preference to receive the notifications. As such, typical IoT architectures do not distinguish between the different types and categories of IoT device (for instance, some IoT devices support Mission Critical (MC) systems, whereas other IoT devices provide consumers with entertainment or convenience). The routing of the notifications to the notification customers without considering network characteristics can overburden network resources, increase transmission delays, increase levels of network congestion, and overburden notification customer recourses. By not controlling how the notifications are routed, notifications that have a higher priority or a time sensitivity cannot be prioritized over other notifications that are less important or not time sensitive.

The disclosed systems and methods can be applied to applications involving a plurality of IoT devices in the 3GPP network. Example applications comprise transportation applications that use a plurality of sensors mounted on a vehicle to track a location or speed of a vehicle. For example, a global positioning system (GPS) device of a commercial truck can periodically record and transmit a location of the truck. For example, a speedometer of the truck can periodically record and transmit a speed of the truck. Example applications comprise residential applications that use a plurality of sensors mounted on a smart device within a residence to record audio or video input related to a surrounding environment. For example, a microphone or a camera of the smart device can continuously record audio or video input associated with users within a proximity of the smart device. Example applications comprise communication applications that use a plurality of sensors to track conditions of components within a mobile device or conditions of a surrounding environment. For example, a battery management system of the mobile device can continuously measure battery life of the mobile device.

For example, a GPS of the mobile device can continuously track a location of the mobile device. Example applications comprise industrial applications that use a large number of devices connected to a wireless network, and smart city models that use a plurality of sensors. For example, street lights may periodically record and transmit measurements or readings, including temperature and traffic conditions. Each of these IoT devices can transmit notifications according to guidelines provided by various entities, including the network provider, the server provider, and/or the application provider.

As briefly described above, one or more IoT devices of the plurality of IoT devices in the 3GPP network can transmit one or more notifications to a telecommunications network. An IoT device can generate a notification based on data that is gathered by the IoT device. For example, the IoT device can belong to a class of IoT devices representing a set of IoT devices that perform a specified operation such as a sensor operation or a control operation. The data gathered by the IoT device can comprise data that is measured, sensed, or received by the IoT device. For example, the data can comprise data associated with environmental conditions, medical conditions, geographic conditions, operating conditions, or household conditions.

In an example, the notification transmitted by the IoT device can be routed by the telecommunications network according to one or more characteristics associated with the 3GPP network or the telecommunications network. The one or more characteristics can comprise a type of the IoT device that transmits the notification, a type of the notification, or a priority of the notification. The priority of the notification can be based on a time sensitivity of the notification or an importance of the notification. For example, the telecommunications network can route the notification by using one or more parameters associated with the one or more characteristics, the one or more parameters being extracted from input received from the 3GPP network or from devices within the telecommunications network.

An input from which a parameter associated with a characteristic used for routing the notification is extracted can be received by the telecommunications network via a signal. For example, the input can be received via the signal that is transmitted by the 3GPP network or by a device within the telecommunications network. In an example, the signal including the input from which the parameter is extracted can be asynchronously received with the notification. For example, the signal including the input from which the parameter is extracted can be received by the system before or after the notification is received. In an example, the signal including the input from which the parameter associated with the characteristic is extracted can be synchronously received with the notification. For example, the signal including the input from which the parameter is extracted can be received by the system at substantially a same time as the notification. For example, the input can be received as part of the notification instead of in a signal received by the telecommunications network.

The SCS node can contain message queues used to store notifications. The SCS node can select a message queue based on the parameter extracted from the input. The SCS node can store the notification in the message queue satisfying the parameter associated with the characteristic used for routing the notification.

The SCS node can identify notification customers in the telecommunications network that are configured to receive notifications. The notification customers can use the notifications to monitor IoT devices based on parameters associated with characteristics of the IoT devices that are loaded into the SCS node. The notification customers can use the notifications to monitor IoT devices further based on characteristics of the notification customers. For example, characteristics of the notification customers comprise preferences of the notification customers. The parameters associated with preferences of the IoT devices can be loaded into the SCS node. The parameters associated with characteristics of the IoT devices and the notification customers can be loaded into the message queues. For example, the characteristics of the IoT devices include locations of the IoT devices, types of the IoT devices, or importance levels of the IoT devices. For example, the characteristics of the notification customers include preferences for receiving notifications based on the parameters associated with characteristics of the IoT devices, and further based on parameters associated with characteristics of the notifications. The characteristics of the notifications include types of the notifications, priorities of the notifications, or time sensitivities of the notifications.

The telecommunications network can maintain a database for storing records associated with preferences for notification customers receiving notifications. The database can contain a table or list of the notification customers in the telecommunications network. The database can store records comprising a table or list of IoT devices that are permitted to access the telecommunications network. For example, the database can contain the parameters associated with characteristics of the IoT devices. In an example, the records are stored in the message queues in the SCS node. The database can be updated to provide capacity as needed, by expanding the number of records for the IoT devices or the notification customers that are stored in the database if a current capacity is insufficient. The database can store records comprising configuration options for the message queues of the SCS node. The SCS node can generate the configuration options based on the preferences of the notification customers. The SCS node can use the configuration options to select message queues to store the notifications. The SCS node can use the configuration options to select and transmit the notifications to the notification customers. For example, the database can be an Apache Cassandra database or other open source database.

The databases can be maintained by different computing resources of a cellular network, including the base station and the Evolved Packet Core. The eNodeB can add, update, and remove the records for the IoT devices or the notification customers from the telecommunications network. In another example, a third-party application server can remove the records for the IoT devices or the notification customers from the telecommunications network.

In an example, the notification customers comprise various types of notification customers. For example, the notification customers comprise devices associated, respectively, with a nonprofit agency, a government agency, and a commercial agency (e.g., a travel agency).

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

Illustrative Systems for Distributing Internet-of-Things Notifications

FIG. 1A is a system according to an embodiment for distributing IoT notifications. In this example, a system 100 can route and store notifications. In some examples, the system 100 can include IoT devices 104 that exchange notifications with notification customers 106 via an SCS node 102 in a monitoring system. The monitoring system can be any sort of monitoring system in a telecommunications network, the telecommunications network comprising a core network and multiple access networks. Such a core network can include a number of network components providing connectivity between the cells of the telecommunications network, between cells of the telecommunications network and those of other telecommunications networks, and between cells of the telecommunications network and devices of other networks. The core network can support packet-switched communications, circuit-switched communications, or both. Further, the core network can be a System Architecture Evolution (SAE) core network or a UMTS core network, or can include network components from both. Also, the core network can include an Internet Protocol (IP) Multimedia subsystem (IMS) layer for supporting packet-switched communications. Further, the core network can include a server, as well as other devices. Such a telecommunications network can typically include one or more radio access networks (RANs) which can be based on a variety of new physical layer technologies (PLT's). For example, a RAN can be configured based on a 3G PLT while another RAN can be configured based on a 4G PLT. The RANs can be connected to the telecommunications network through one or more physical links interconnecting network nodes.

In some embodiments, the SCS node 102 can be deployed into the system 100 to connect the SCEF 108 as well as various application servers (AS's), including IoT Application servers, to the cellular network. The SCS node can connect the AS's to the cellular network via a Machine Type Communication Inter Working Function (MTC IWF) to communicate with user equipment, including the IoT devices 104. An AS in some examples hosts applications to be executed or interfaced with the IoT devices 104. The MTC IWF can interface with a Home Subscriber Server (HSS) to provision or remove IoT devices 104 from the cellular network.

The SCS node 102 can communicate with a vehicle 104(1), a smart device 104(2), and a mobile device 104(3). Because the various IoT devices 104 possess differing core functionalities, different IoT protocols can be used across the devices 104. For example, the vehicle 104(1) can travel to various locations and, as a result, can be configured to communicate via an IoT protocol which provides robust and reliable support for communication in each of the locations. In contrast, the smart device 104(2) can be unconstrained in terms of limitations due to variability locations, while requiring a high rate of data transfer in order to stream media content. Accordingly, the smart device 104(2) can be configured to communicate via a different IoT protocol than the vehicle 104(1). The wide and ever increasing variety of applications for IoT devices has already led to the development of numerous IoT protocols and will undoubtedly lead to more. In some embodiments, the SCS node 102 is dynamically re-configurable to support differing IoT protocols. For example, the SCS node 102 can include one or more software defined radios (SDRs) which can be programmed, based on updated IoT protocol data received via the monitoring system.

The SCS node 102 can establish a connection with the IoT devices 104 via the SCEF 108. One or more of the IoT devices 104 can provide, via the SCEF 108, one or more corresponding notifications to the SCS node 102 to be stored in the SCS node 102. The one or more notifications can be received by the SCS node 102 at substantially a same time or received sequentially by the SCS node 102. In an example, the vehicle 104(1) can transmit a notification that is received by the SCEF 108, via a Mobility Management Entity (MME). The MME can interface with the SCEF 108 and support functions related to subscriber and session management, including security functionality, terminal-to-network session handling, and idle terminal location management. The SCEF 108 can provide for small data transfers and controls messaging to provide a secure way to expose the services and capabilities provided by cellular network interfaces. In one example, the SCEF 108 exposes the capability to deploy IoT devices in a cellular network that includes the SCS node 102.

The SCEF 108 in the 3GPP network can receive the notification from the vehicle 104(1) and transmit the notification to the SCS node 102 in the telecommunication network. In some instances, the SCS node 102 can accept the notification and send a notification confirmation to the vehicle 104(1) via the SCEF 108.

The SCS node 102 can route notifications based on parameters associated with characteristics of the notifications or the IoT devices 104. In an embodiment, the SCS node 102 routes the notification received from the vehicle 104(1) based on the characteristics of the vehicle 104(1).

The SCS node 102 can retain the notification that is received from the vehicle 104(1) and store the notification in the SCS node 102. In an example, the system 100 can configure the SCS node 102 to persistently retain the notification. For example, the SCS node 102 can retain the notification after the notification is transmitted by the SCS node 102.

The SCS node 102 can receive contents in the notification indicating the parameters associated with characteristics of the notification or the vehicle 104(1). In an example, the message queues 110 can include Kafka message queues. The contents can include a timestamp, a key, and a value. For example, the timestamp indicates a time at which the notification is transmitted by the vehicle 104(1). For example, the key is used to determine a partition within a log in one of the message queues 110 to which the notification is appended. For example, the value includes a payload of the notification. The SCS node 102 can use the contents in the notification to identify the parameters associated with characteristics of the notification or the vehicle 104(1).

Upon determining that the notification is received by the SCS node 102, the system 100 can configure the SCS node 102 to determines that a message queue 110(1), a message queue 110(2), or a message queue 110(3) is to be used to receive and store the notification. In an example, one or more of the message queues 110 can be used to store the notification. For example, the SCS node 102 determines that the message queue 110(1) is to be used to store the notification.

The system 100 can configure the SCS node 102 to store configuration options used to control operation of the message queues 110. The SCS node 102 can route the notification based on the configuration options of the message queues 110. The SCS node 102 can perform a comparison or cross-correlation between the parameters in the notification and the configuration options of the message queues 110. The SCS node 102 can select the message queue 110(1) based on the comparison and store the notification in the message queue 110(1).

The system 100 can control notification customers 106 to provide, to the SCS node 102, corresponding requests for notifications. The SCS node 102 can receive, from the notification customers 106 and in the corresponding requests for notifications, corresponding identifiers of the notification customers 106. The SCS node 102 can communicate with the notification customers 106 based on the corresponding identifiers. In an example, a request can be received by the SCS node 102 and from a notification customer 106(*a*). The request can include parameters associated with characteristics of the notification customer 106.

The SCS node 102 can transmit the notification from the message queue 110(1) to the notification customer 106(*a*), the notification customer 106(*b*), or the notification customer 106(*c*) based on the parameters associated with characteristics of the notification customers 106. In an example, the SCS node 102 can transmit the notification from the message queue 110(1) to the notification customer 106(*a*) based on the parameters associated with characteristics of the notification customer 106(*a*).

The SCS node 102 can store, in the message queue 110(1) and based on the configuration options of the message queue 110(1), the notification received from the vehicle 104(1). The SCS node 102 can determine the request received from the notification customer 106(*a*) includes parameters associated with characteristics that are satisfied by configuration options of the message queue 110(1). The SCS node 102 can connect the notification customer 106(*a*) to the message queue 110(1) based on the request including the parameters associated with characteristics that are satisfied by configuration options of the message queue 110(1). In an embodiment, the SCS node 102 can automatically transmit the notification to the notification customer 106(*a*) based on the notification being stored in the message queue 110(1).

In an example, the SCS node 102 can provide the notification to only the notification customer 106(*a*) based on the notification being stored in the message queue 110(1), which has the configuration options that satisfy the parameters associated with the characteristics of the notification customer 106(*a*). For example, the notification customer 106(*b*) and the notification customer 106(*c*) transmit requests to the SCS node 102 that include corresponding parameters associated with the characteristics of the notification customer 106(*b*) and the notification customer 106(*c*). Upon determining that the parameters associated with the characteristics of the notification customer 106(*b*), but not the notification customer 106(*c*), are satisfied by the configuration options of the message queue 110(1), the SCS node 102 transmits the notification to the notification customer 106(*b*). In such a case, the SCS node 102 does not transmit the notification to the notification customer 106(*c*).

The SCS node 102 can retain notifications after the notifications are provided to the notification customers 106. The SCS node 102 can transmit, after the notifications are provided to a subset the notification customers 106, the notifications to one or more remaining ones of the notification customers 106. The SCS node 102 can sequentially or substantially simultaneously provide the notifications to multiple notification customers 106.

The notification customers 106 can transmit confirmation indicators to the SCS node 102 based on the notifications having been received by the notification customers 106. In an example, the notification customer 106(*a*) can transmit a confirmation indicator to the SCS node 102 based on the notification having been received by the notification customer 106(*a*). The SCS node 102 can store the confirmation indicator received by the notification customer 106(*a*). For example, the SCS node 102 can use the confirmation indicator to avoid retransmitting the notification to the notification customer 106(*a*), and to avoid transmitting the notification to the notification customer 106(*c*).

Figure 1B:
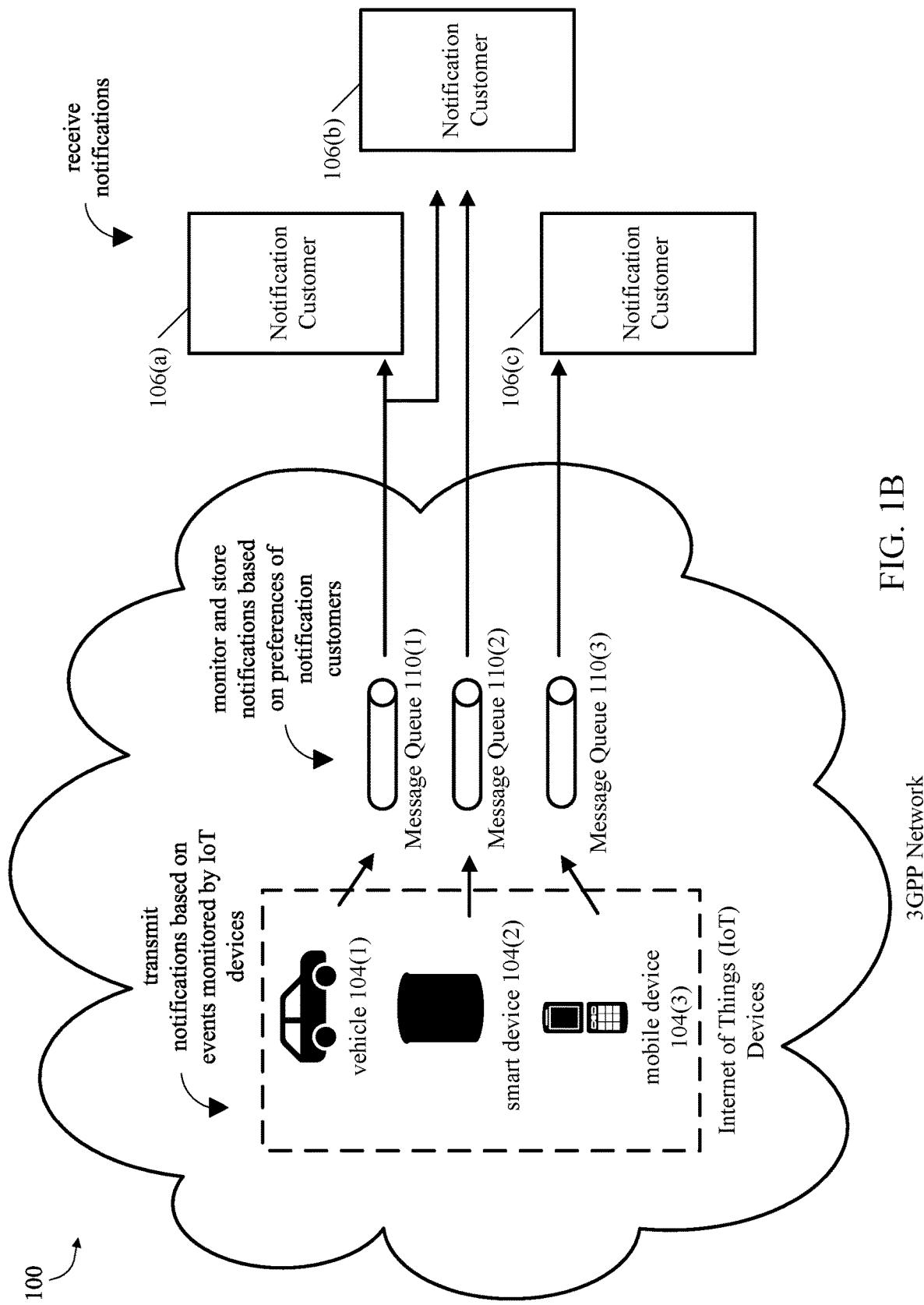
FIG. 1B is a system according to an embodiment for distributing IoT notifications.

FIG. 1B is a system according to an embodiment for distributing IoT notifications. In this example, a system 100 can include IoT devices 104 that exchange notifications with notification customers 106 by using message queues 110, as in FIG. 1A, but without the SCEF 108 and the SCS node 102. The IoT devices 104, the notification customers 106, and the message queues 110 in FIG. 1B can be implemented by, respectively, the IoT devices 104, the notification customers 106, and the message queues 110 in FIG. 1A.

The message queues 110 can be implemented somewhere in a 3GPP network. In an example, the message queues 110 are implemented on a SCEF. For example, the SCEF could include message queues 110. In an example, the message queues 110 are implemented on some other node that performs at least functions that are performed by the SCEF 108 and the SCS node 102 described in FIG. 1A. For example, such a node could be implemented in a centralized or distributed fashion.

Figure 2:
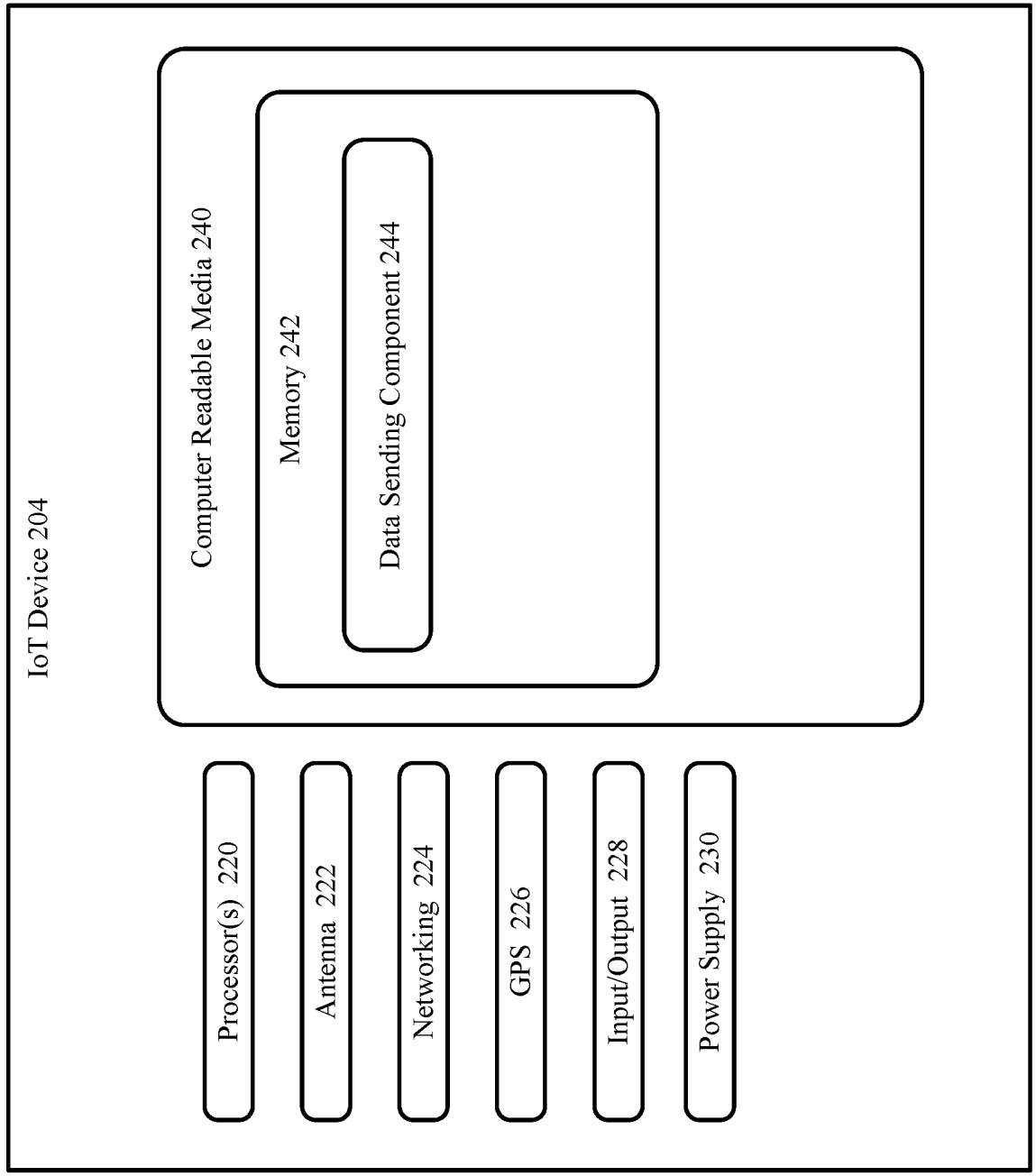
FIG. 2 schematically illustrates example hardware and software for an IoT device according to the disclosed systems and methods.

FIG. 2 illustrates an example IoT device for use with the disclosed systems and methods. In this example, an IoT device node 200 includes an IoT device 204. The IoT device 204 includes a processor 220, an antenna 222, networking component 224, GPS 226, input/output ports 228, power supply 230, and a computer readable media 240. The computer readable media 240 includes a memory 242 that stores instructions for sending data to a notification customer.

The IoT device 204 includes one or more processors 220. Processor(s) 220 can be any type of processors, including a central processing unit (CPU), a graphics processing unit (GPU), or both CPU and GPU, or other processing unit or component known in the art.

The antenna 222 provides radio frequency (RF) communications with a licensed cellular network, such as a 5G/NR network, an LTE network, a UTMS network, or a GSM network. The networking component 224 can include ports and modules for communicating with the outside world. The networking component 224 includes transceiver ports for local area networks (LANs) and wide area networks (WANs). In one example, the LAN and/or WAN ports provide a wired connection to the Internet. The networking component 224 can also include a wireless communications module that includes one or more wireless transceivers to wirelessly transmit and receive data. For example, the transceivers can include a network interface card (NIC), a network adapter, a LAN adapter, or a physical, virtual, or logical address to connect to various network(s), for example. To increase throughput for exchanging wireless data, the transceivers can utilize multiple-input/multiple-output (MIMO) technology or other high throughput wireless standards such as 802.11ac. The transceivers can comprise any type of wireless transceivers capable of engaging in wireless, radio frequency (RF) communication. The transceivers are not limited to 802.11 ac, but can include one or more modems for engaging in IEEE 802.11-based technologies, IEEE 802.15-based technologies and its progeny (e.g., Zigbee, Bluetooth, Low-Rate Wireless Personal Area Networks, Wireless HART, MiWi), IEEE 806.15-based technologies (WiMAX), WLAN, near-field communications, and infrared communications.

The GPS 226 provides global positioning data for the IoT device. Input/output (I/O) ports 210 provide interfacing with the external environment. The I/O ports can include USB, serial, parallel, HDMI, display ports, digital video interface (DVI), Ethernet, and any other ports known to a person of ordinary skill in the art. These input/out ports can collectively be referred to as I/O 210. The I/O ports interface with device(s), such as a keypad, a cursor control, a touchsensitive display, voice input device, etc., a display, speakers, printers, etc. These ports are well known in the art and need not be discussed at length here.

The IoT device 204 also includes power supply 230 for providing AC and/or DC power for the IoT device. In an example, the power supply 230 is a battery. In an example, the power supply 230 includes an AC adaptor or a DC adaptor with a backup power supply such as a backup battery.

The IoT device 204 includes computer-readable media 240. As an example, the computer-readable media 240 includes memory 242 (or other storage components) for storing computer executable instructions that perform the disclosed systems and methods. Computer readable media can include any type of memory or storage media for a processor, including RAM, ROM, firmware, flash memory, EEPROM, or other types of memory known to one of ordinary skill in the art. One component of computer readable media 240 is a component to send data to a EPC. The data can be test data. In an example, the data can be data generated or monitored by the IoT device. Tangible computer-readable media can include volatile and nonvolatile, removable and non-removable media implemented in any method or technology for storage of information, such as computer readable instructions, data structures, program modules, or other data. In an example, computer readable media can include hard disk drives for storing the instructions for the data sending component 244. Other computer readable media can include magnetic disks, optical disks, or tape, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the IoT device 204. Any such tangible computer-readable media can be included in IoT device 204.

Figure 3:
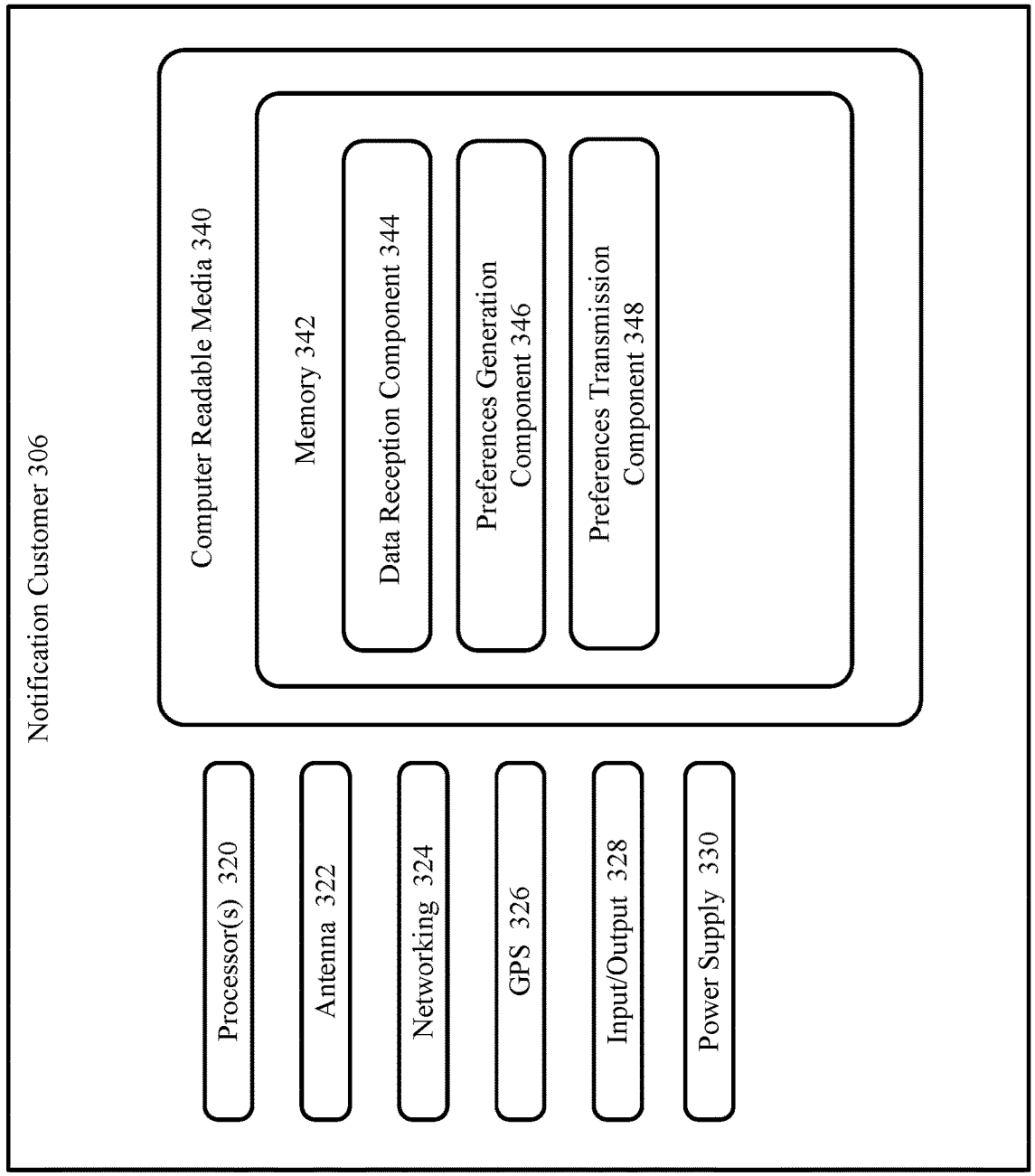
FIG. 3 schematically illustrates example hardware and software for Service Capability Server (SCS) node according to the disclosed systems and methods.

FIG. 3 depicts example hardware and software of an example notification customer. In this example, a notification customer node 300 includes a notification customer 306. The notification consumer 306 includes one or more processors 320 and a computer readable media 340. The computer readable media 340 includes memory 342. Memory 342 stores computer instructions that when executed cause the one or more processors of the notification consumer 306 to perform various operations for controlling notifications provided by IoT devices. The example shown in FIG. 3 includes a data reception component 344, a preferences generation component 346, and a preferences transmission component 348.

Example computer readable media 340 include RAM, ROM, firmware, flash memory, EEPROM, or other types of memory storage known to one of ordinary skill in the art. Tangible computer-readable media can include volatile and nonvolatile, removable and non-removable media implemented in any method or technology for storage of information, such as computer readable instructions, data structures, program components, or other data. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 320 of the notification consumer 306. Any such tangible computer-readable media can be part of the notification consumer 306.

Data reception component 344 includes computer instructions that when executed by one or more processors receives data from IoT devices.

Preferences generation component 346 includes computer instructions that when executed by one or more processors generates parameters of the notification customer 306. The output of the preferences generation component 346 can include parameters associated with characteristics of the notification customer 306, the characteristics including the preferences of the notification customer 306.

Preferences transmission component 348 can include computer instructions that when executed by one or more processors transmits the parameters associated with the characteristics of the notification customer 306.

The notification customer 300 can include networking component 324 for providing ports and components for communicating with the other elements of the system such as that shown in FIG. 1. The networking component 324 can include transceiver ports for local area networks (LANs) and wide area networks (WANs). In one example, the LAN and/or WAN ports provide a wired connection to an Intranet and/or Internet. The networking component can also provide connections to other components of the carrier's base station, as well as to the back-end system of the carrier. The networking component 324 can also include a wireless communications component that includes one or more wireless transceivers. For example, the transceivers can include a network interface card (NIC), a network adapter, a LAN adapter, or a physical, virtual, or logical address to connect to various network(s), or to the back-end system of the carrier's network, for example. To increase throughput for exchanging wireless data, the transceivers can utilize multiple-input/multiple-output (MIMO) technology or other high throughput wireless standards such as 802.11ac. The transceivers can comprise any type of wireless transceivers capable of engaging in wireless, radio frequency (RF) communication. The transceivers can also include other wireless modems, such as a modem for engaging in Wi-Fi, WiMax, Bluetooth, or infrared communication.

Figure 4:
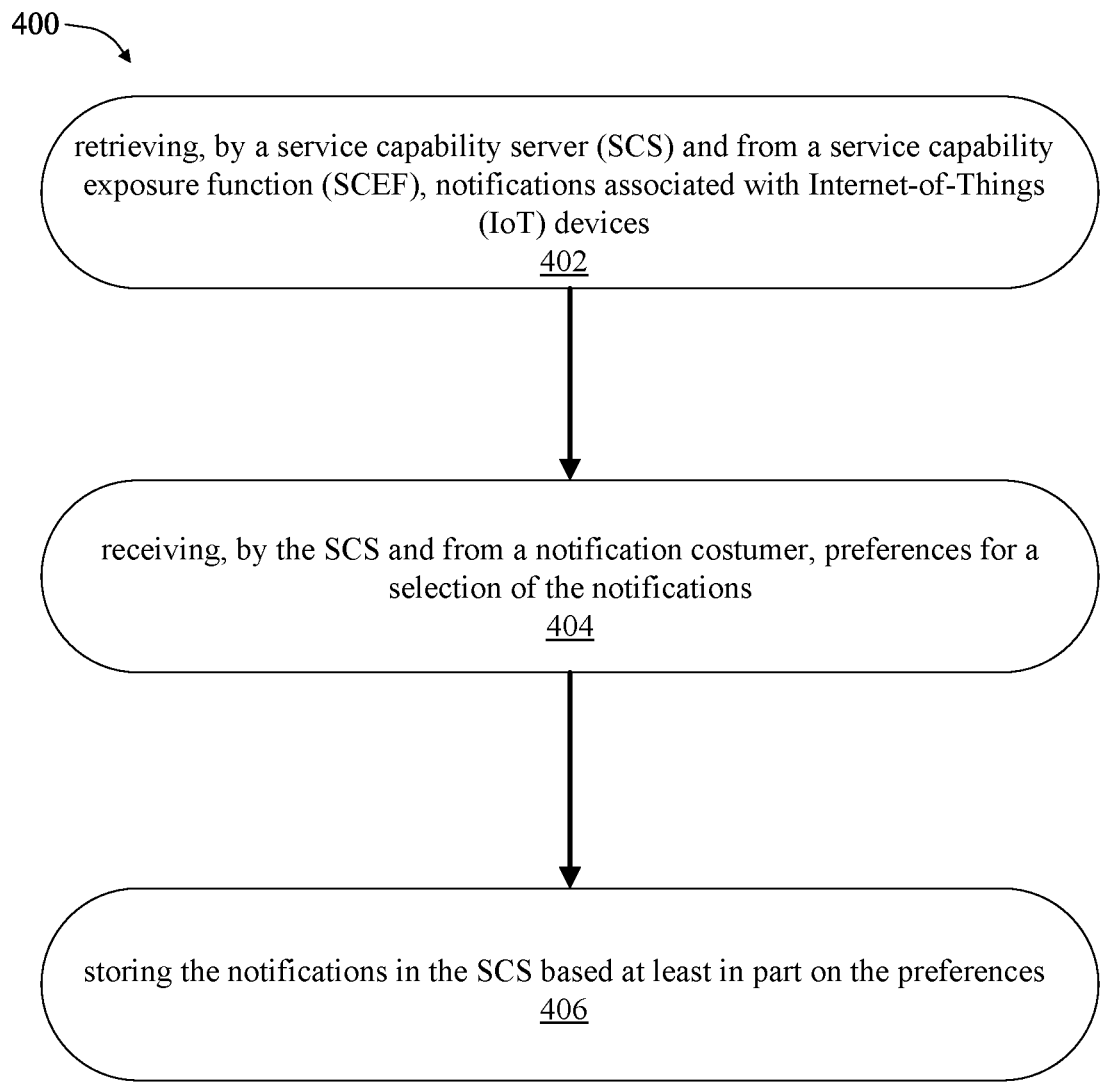
FIG. 4 depicts a process according to an embodiment for receiving IoT notifications to be distributed based on a preference associated with a notification customer.

FIG. 4 depicts a process according to an embodiment for receiving IoT notifications to be distributed based on a preference associated with a notification customer. For example, a process 400 can be performed by the system 100. Operations shown in FIG. 4 can be performed in any order except when otherwise specified, or when data from an earlier step is used in a later step. For clarity of explanation, reference is herein made to various components shown in FIGS. 1A and 1B that can carry out or participate in the steps of the exemplary method. It should be noted, however, that other components can be used; that is, exemplary method(s) shown in FIG. 4 not limited to being carried out by the identified components. At step 402, a service capability server (SCS) 102 retrieves, from a service capability exposure function (SCEF) 108, notifications associated with Internet-of-Things (IoT) devices 104. At step 404, the SCS 102 retrieves, from a notification customer 106(*a*), 106(*b*), or 106(*c*), preferences for a selection of the notifications. At step 406, the SCS 102 stores the notifications based at least in part on the preferences.

Figure 5:
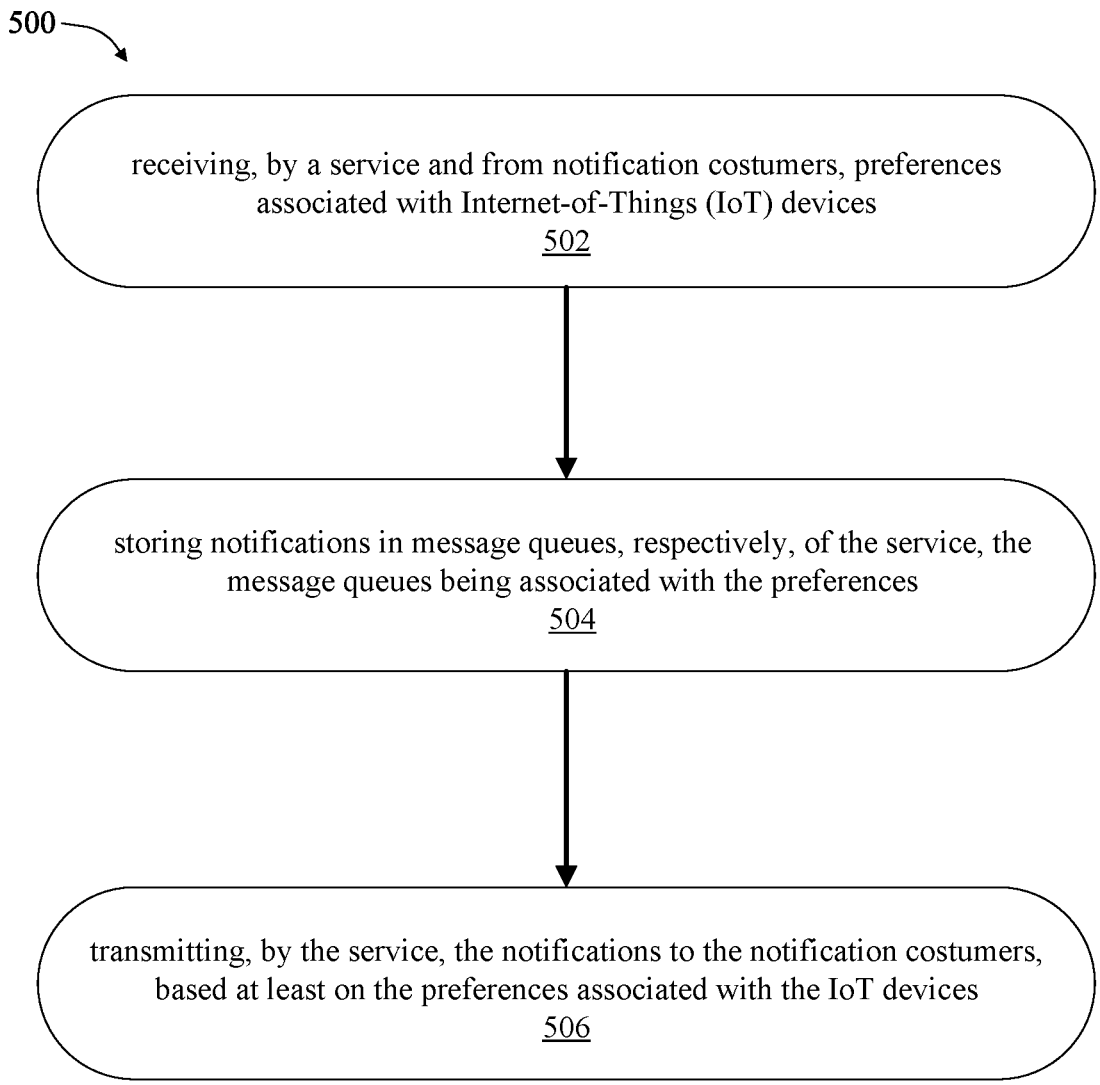
FIG. 5 depicts a process according to an embodiment for distributing IoT notifications based on a preference associated with a notification customer.

FIG. 5 depicts a process according to an embodiment for receiving IoT notifications to be distributed based on a preference associated with a notification customer. For example, a process 500 can be performed by the system 100. Operations shown in FIG. 5 can be performed in any order except when otherwise specified, or when data from an earlier step is used in a later step. For clarity of explanation, reference is herein made to various components shown in FIGS. 1A and 1B that can carry out or participate in the steps of the exemplary method. It should be noted, however, that other components can be used; that is, exemplary method(s) shown in FIG. 5 not limited to being carried out by the identified components. At step 502, a service retrieves, from notification customers 106, preferences associated with Internet-of-Things (IoT) devices 104. At step 504, the service stores, in message queues 110, respectively, notifications, the message queues 110 being associated with the preferences. At step 506, the service transmits the notifications to the notification customers 106, based at least on the preferences associated with the IoT devices 104.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
a processor; and
computer-readable instructions that, when executed by the processor, cause the system to perform operations including:
receiving, from notification customers, customer preferences for routing a selection of notifications associated with Internet-of-Things (IoT) devices, the customer preferences including a first customer preference, a second customer preference, a third customer preference, and a fourth customer preference, the first customer preference received from a first notification customer of the notification customers, the second customer preference received from a second notification customer of the notification customers, the third customer preference received from a third notification customer of the notification customers, the fourth customer preference received from a fourth notification customer of the notification customers;
utilizing the first customer preference to configure a first message queue to have a notification type configuration option satisfying a notification type parameter, no preferences of the second notification customer, the third notification customer, or the fourth notification customer being received for the notification type configuration option of the first message queue;
utilizing the second customer preference to configure a second message queue to have a notification priority configuration option satisfying a notification priority parameter, no preferences of the first notification customer, the third notification customer, or the fourth notification customer being received for the notification priority configuration option of the second message queue;
utilizing the third customer preference to configure a third message queue to have a IoT device location configuration option satisfying an IoT device location parameter, no preferences of the first notification customer, the second notification customer, or the fourth notification customer being received for the IoT device location configuration option of the third message queue;
utilizing the fourth customer preference that to configure a fourth message queue to have an IoT device type configuration option satisfying an IoT device type parameter, no preferences of the first notification customer, the second notification customer, or the third notification customer being received for the IoT device type configuration option of the fourth message queue;
receiving first notifications with a first received parameter that includes the notification type parameter or the notification priority parameter;
receiving second notifications with a second received parameter that includes the IoT device location parameter or the IoT device type parameter;
utilizing the notification type configuration option or the notification priority configuration option to perform a first message queue selection;
utilizing the IoT device location configuration option or the IoT device type configuration option to perform a second message queue selection;
storing the first notifications in the first message queue or the second message queue satisfying the first received parameter based on the first message queue selection;
storing the second notifications in the third message queue or the fourth message queue satisfying the second received parameter based on the second message queue selection; and
transmitting the selection of notifications, the selection of notifications comprising at least one of i) the first notifications being transmitted from the first message queue or the second message queue, and, respectively, to the first notification customer or the second notification customer, or ii) the second notifications being transmitted from the second message queue or the third message queue, and, respectively, to the third notification customer or the fourth notification customer.

2. The system of claim 1, wherein
the first message queue, the second message queue, the third message queue, and the fourth message queue comprise a first event streaming message queue, a second event streaming message queue, a third event streaming message queue, and a fourth event streaming message queue, respectively.

3. The system of claim 1, wherein transmitting the selection of notifications further comprises:
transmitting the first notifications from the first message queue and to the first notification customer; and
transmitting the second notifications from the second message queue and to the third notification customer, and
wherein the computer-readable instructions, when executed by the processor, further cause the system to perform operations including:
receiving an error message, the error message indicating the first notifications were not received by the first notification customer; and
retransmitting, to the first notification customer, the first notifications.

4. The system of claim 1, wherein receiving the first notifications further comprises retrieving, by a service interposed between a service capability exposure function (SCEF) and the notification customers, the first notifications.

5. The system of claim 1, wherein:
a service capability server (SCS) node comprising the first message queue and the second message queue is configured to communicate based on different IoT protocols associated with different IoT devices that transmit the selection of notifications; and the SCS node is re-configurable by programming the SCS node to support the different IoT protocols.

6. The system of claim 1, wherein a service capability server (SCS) node comprising the first message queue and the second message queue is re-configurable by programming the SCS node to support an IoT protocol associated IoT devices.

7. The system of claim 1, wherein the first notifications are associated with notification type, and third notifications are associated with other notification types, and
wherein utilizing the first customer preference further comprises utilizing the first customer preference to configure the first message queue to i) store the first notifications, and ii) not store the third notifications.

8. The system of claim 1, wherein the second notifications are associated with an IoT device type, and third notifications are associated with other IoT device types, and
wherein utilizing the second customer preference further comprises utilizing the second customer preference to configure the second message queue to i) store the second notifications, and ii) not store the third notifications.

9. A method comprising:
receiving, from notification customers, customer preferences for routing a selection of notifications associated with Internet-of-Things (IoT) devices, the customer preferences including a first customer preference, a second customer preference, a third customer preference, and a fourth customer preference, the first customer preference received from a first notification customer of the notification customers, the second customer preference received from a second notification customer of the notification customers, the third customer preference received from a third notification customer of the notification customers, the fourth customer preference received from a fourth notification customer of the notification customers;
utilizing the first customer preference to configure a first message queue to have a notification type configuration option satisfying a notification type parameter, no preferences of the second notification customer, the third notification customer, or the fourth notification customer being received for the notification type configuration option of the first message queue;
utilizing the second customer preference to configure a second message queue to have a notification priority configuration option satisfying a notification priority parameter, no preferences of the first notification customer, the third notification customer, or the fourth notification customer being received for the notification priority configuration option of the second message queue;
utilizing the third customer preference to configure a third message queue to have a IoT device location configuration option satisfying an IoT device location parameter, no preferences of the first notification customer, the second notification customer, or the fourth notification customer being received for the IoT device location configuration option of the third message queue;
utilizing the fourth customer preference that to configure a fourth message queue to have an IoT device type configuration option satisfying an IoT device type parameter, no preferences of the first notification customer, the second notification customer, or the third notification customer being received for the IoT device type configuration option of the fourth message queue;
receiving first notifications with a first received parameter that includes the notification type parameter or the notification priority parameter;
receiving second notifications with a second received parameter that includes the IoT device location parameter or the IoT device type parameter;
utilizing the notification type configuration option or the notification priority configuration option to perform a first message queue selection;
utilizing the IoT device location configuration option or the IoT device type configuration option to perform a second message queue selection;
storing the first notifications in the first message queue or the second message queue satisfying the first received parameter based on the first message queue selection;
storing the second notifications in the third message queue or the fourth message queue satisfying the second received parameter based on the second message queue selection; and
transmitting the selection of notifications, the selection of notifications comprising at least one of i) the first notifications being transmitted from the first message queue or the second message queue, and, respectively, to the first notification customer or the second notification customer, or ii) the second notifications being transmitted from the second message queue or the third message queue, and, respectively, to the third notification customer or the fourth notification customer.

10. The method of claim 9, wherein the first message queue, the second message queue, the third message queue, and the fourth message queue comprise a first event streaming message queue, a second event streaming message queue, a third event streaming message queue, and a fourth event streaming message queue, respectively.

11. The method of claim 9, wherein transmitting the selection of notifications further comprises:
transmitting the first notifications from the first message queue and to the first notification customer; and
transmitting the second notifications from the second message queue and to the third notification customer, further comprising:
receiving an error message, the error message indicating the first notifications were not received by the first notification customer; and
retransmitting, to the first notification customer, the first notifications.

12. The method of claim 9, wherein receiving the first notifications further comprises retrieving, by a service interposed between a service capability exposure function (SCEF) and the notification customers, the first notifications.

13. The method of claim 9, wherein the first notifications are associated with a notification type, and third notifications are associated with other notification types, and
wherein utilizing the first customer preference further comprises utilizing the first customer preference to configure the first message queue to i) store the first notifications, and ii) not store the third notifications.

14. The method of claim 9, wherein the second notifications are associated with an IoT device type, and third notifications are associated with other IoT device types, and
wherein utilizing the second customer preference further comprises utilizing the second customer preference to configure the second message queue to i) store the second notifications, and ii) not store the third notifications.

15. One or more non-transitory computer-readable media storing instructions executable by one or more processors, wherein the instructions, when executed, cause the one or more processors to perform operations including:

receiving, from notification customers, customer preferences for routing a selection of notifications associated with Internet-of-Things (IoT) devices, the customer preferences including a first customer preference, a second customer preference, a third customer preference, and a fourth customer preference, the first customer preference received from a first notification customer of the notification customers, the second customer preference received from a second notification customer of the notification customers, the third customer preference received from a third notification customer of the notification customers, the fourth customer preference received from a fourth notification customer of the notification customers;

utilizing the first customer preference to configure a first message queue to have a notification type configuration option satisfying a notification type parameter, no preferences of the second notification customer, the third notification customer, or the fourth notification customer being received for the notification type configuration option of the first message queue;

utilizing the second customer preference to configure a second message queue to have a notification priority configuration option satisfying a notification priority parameter, no preferences of the first notification customer, the third notification customer, or the fourth notification customer being received for the notification priority configuration option of the second message queue;

utilizing the third customer preference to configure a third message queue to have a IoT device location configuration option satisfying an IoT device location parameter, no preferences of the first notification customer, the second notification customer, or the fourth notification customer being received for the IoT device location configuration option of the third message queue;

utilizing the fourth customer preference that to configure a fourth message queue to have an IoT device type configuration option satisfying an IoT device type parameter, no preferences of the first notification customer, the second notification customer, or the third notification customer being received for the IoT device type configuration option of the fourth message queue;

receiving first notifications with a first received parameter that includes the notification type parameter or the notification priority parameter;

receiving second notifications with a second received parameter that includes the IoT device location parameter or the IoT device type parameter;

utilizing the notification type configuration option or the notification priority configuration option to perform a first message queue selection;

utilizing the IoT device location configuration option or the IoT device type configuration option to perform a second message queue selection;

storing the first notifications in the first message queue or the second message queue satisfying the first received parameter based on the first message queue selection;

storing the second notifications in the third message queue or the fourth message queue satisfying the second received parameter based on the second message queue selection; and transmitting the selection of notifications, the selection of notifications comprising at least one of i) the first notifications being transmitted from the first message queue or the second message queue, and, respectively, to the first notification customer or the second notification customer, or ii) the second notifications being transmitted from the second message queue or the third message queue, and, respectively, to the third notification customer or the fourth notification customer.

16. The one or more non-transitory computer-readable media of claim 15, wherein the first message queue, the second message queue, the third message queue, and the fourth message queue comprise a first event streaming message queue, a second event streaming message queue, a third event streaming message queue, and a fourth event streaming message queue, respectively.

17. The one or more non-transitory computer-readable media of claim 15, wherein transmitting the selection of notifications further comprises:

transmitting the first notifications from the first message queue and to the first notification customer; and transmitting the second notifications from the second message queue and to the third notification customer, the operations further including:

receiving an error message, the error message indicating the first notifications were not received by the first notification customer; and retransmitting, to the first notification customer, the first notifications.

18. The one or more non-transitory computer-readable media of claim 15, wherein receiving the first notifications further comprises retrieving, by a service interposed between a service capability exposure function (SCEF) and the notification customers, the first notifications.

19. The one or more non-transitory computer-readable media of claim 15, wherein the first notifications are associated with a notification type, and third notifications are associated with other notification types, and wherein utilizing the first customer preference further comprises utilizing the first customer preference to configure the first message queue to i) store the first notifications, and ii) not store the third notifications.

20. The one or more non-transitory computer-readable media of claim 15, wherein the second notifications are associated with an IoT device type, and third notifications are associated with other IoT device types, and wherein utilizing the second customer preference further comprises utilizing the second customer preference to configure the second message queue to i) store the second notifications, and ii) not store the third notifications.

* * * * *